Figure 1:
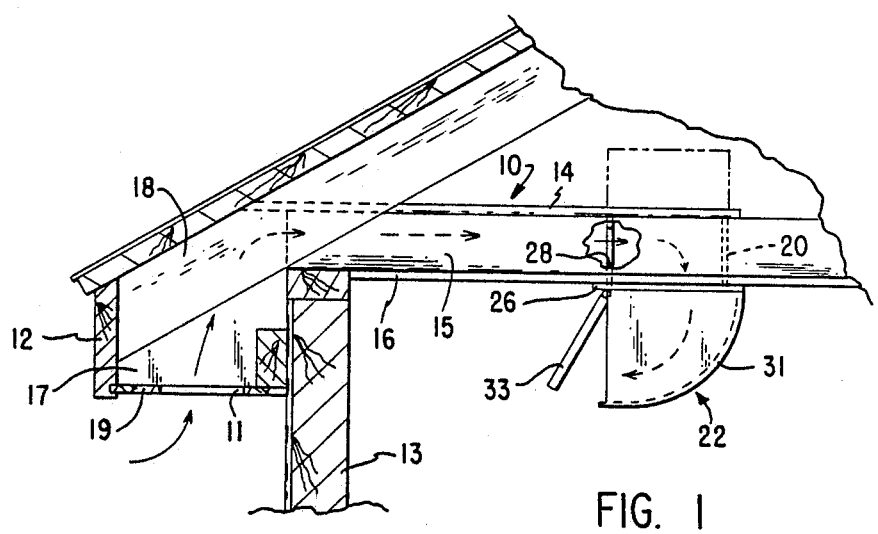

United States Patent [19]

Meendering

[11] Patent Number: 4,811,656
[45] Date of Patent: Mar. 14, 1989

[54] LIVESTOCK BUILDING VENTILATOR

[76] Inventor: Allan W. Meendering, 811 3rd St., Hull, Iowa 51239

[21] Appl. No.: 170,780

[22] Filed: Mar. 21, 1988

[51] Int. Cl.[4] .............................................. F24F 7/00
[52] U.S. Cl. ........................................... 98/37; 98/33.1
[58] Field of Search ................. 98/32, 33.1, 37, 40.05, 98/40.17, 40.19, 118

[56] References Cited

U.S. PATENT DOCUMENTS

| | | | |
|---|---|---|---|
| 1,538,645 | 5/1925 | Markey | 98/37 |
| 2,212,468 | 8/1940 | Ferris | 98/37 |
| 3,299,798 | 1/1967 | Habben | 98/37 X |
| 3,694,222 | 9/1972 | Pardoel et al. | 98/33.1 |
| 3,706,271 | 12/1972 | Mieczkowski | 98/37 X |
| 4,334,577 | 6/1982 | George | 165/54 |
| 4,671,350 | 6/1987 | Toukola | 98/33.1 X |

FOREIGN PATENT DOCUMENTS

| | | | |
|---|---|---|---|
| 915386 | 7/1949 | Fed. Rep. of Germany | 98/33.1 |
| 1226212 | 3/1971 | United Kingdom | 98/33.1 |

Primary Examiner—Harold Joyce

[57] ABSTRACT

A ventilating system for a livestock confinement barn in which the outside air is directed against a wall or against other streams of air to destroy direct drafts of air which might chill the enclosed livestock.

4 Claims, 2 Drawing Sheets

U.S. Patent   Mar. 14, 1989   Sheet 2 of 2   4,811,656

LIVESTOCK BUILDING VENTILATOR
NAME: Allen W. Meendering TITLE: Livestock Building Ventilator

BACKGROUND AND SUMMARY OF THE INVENTION

This invention pertains to ventilating systems for buildings specifically adapted to house livestock. The system includes vents adapted to direct the airflow in a direction adapted to create a turbulence designed to avoid direct drafts on the livestock.

In years past, most livestock was raised in open pastures, feed lots and the like. Livestock under those conditions were subjected to a full range of temperatures from the heat of summer to the bitter cold of winter in the northern parts of the United States. Frequently at those extremes of temperatures, the animals were subject to added stress because of the weather. Precipitation in the form of rain or snow added to that stress. The result was sometimes illness; or at the very least, a reduction in the efficiency of the conversion of feed into meat.

More recently meat-type animals have been raised in enclosesd buildings. Especially female animals during late gestation and just after birth of their young have been confined in pens in fully enclosed buildings. Both the female and the young are susceptible to disease at these times, and are best protected from either cold or hot drafts within the building.

By my invention, I provide a ventilating system that avoids direct draft onto the animals in the building, at the same time providing fresh air and avoiding chilling or overheating the livestock. Besides avoiding draft, my invention provides fresh and cool air to the area of the building at which the manure handling equipment is normally located. It is accepted that animals tend to go to cooler air to drop manure, and thus by my system, I provide for more convenience in manure handling because the animals will tend to congregrate near the fresh air.

It might also be noted that in my new system, all of the air in the buildings is drawn to certain exhaust fans and that by the introduction of fresh air in a turbulent condition in which the air is not allowed to become stale, I provide an improved ventilation system.

My system also provides much better clearing up of carbon monoxide, ammonia gas and moisture. Previous systems accomplished this only by drawing large amounts of air through the building. These amounts were acceptable when the air was reasonably warm. However in winter climates in northern states, the amount of air required to eliminate staleness was excessive so that it became too cold. By causing the turbulence, I pick up the carbon monoxide, ammonia gas, etc. without the need for pulling in the excess air that was required by former systems.

FIGURES

Figure 2:
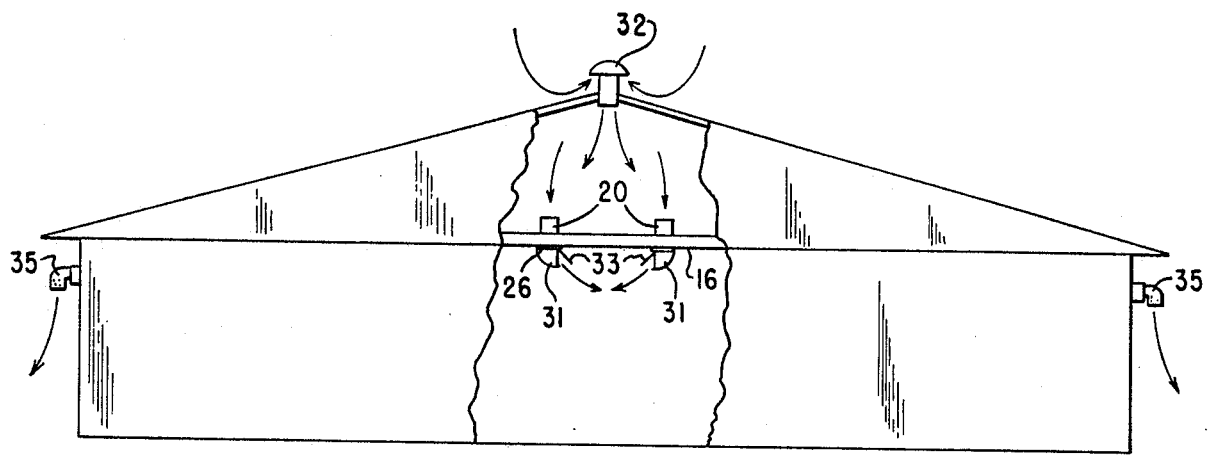
Figure 3:
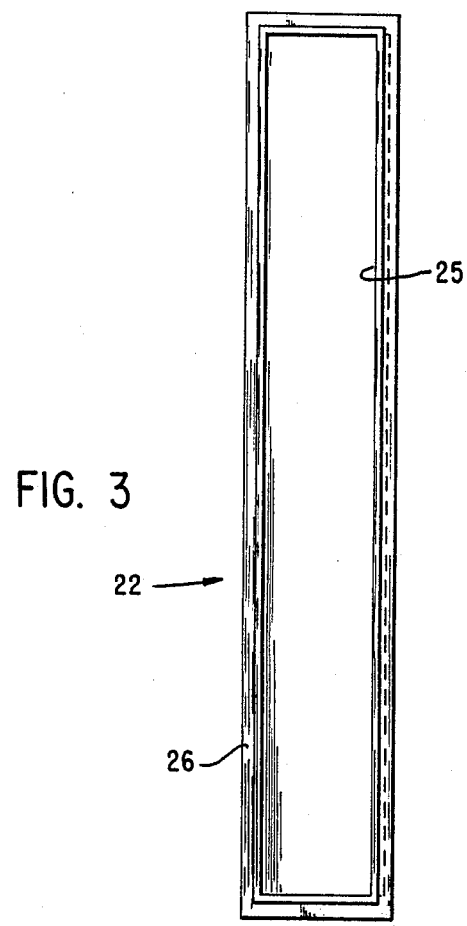
Figure 4:
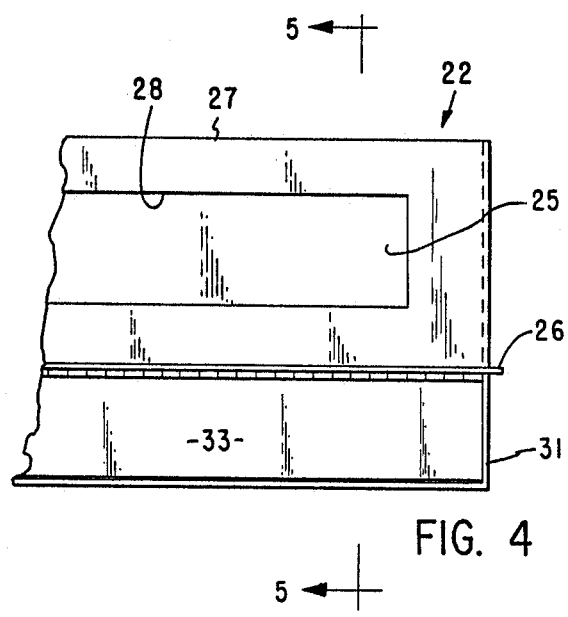
Figure 5:
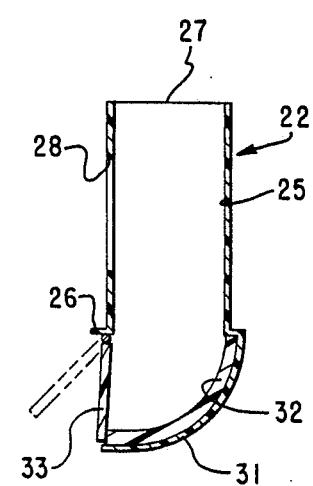

FIG. 1 is a detailed sectional view of the duct and ventilator of my system as it would normally be used, FIG. 2 is a diagrammatic view of a center installation of my system which may be desired in certain applications, FIG. 3 is a top plan view of the ventilator used in my system, FIG. 4 is an elevational view of a part of the ventilator and FIG. 5 is a sectional view from line 5—5 of FIG. 4.

DESCRIPTION

Briefly my invention comprises a ventilating system especially useful in buildings designed for the raising of livestock. The system avoids the problem of the direct draft of cold outside air onto the livestock in the building.

More specifically and referring to the drawings, my system is designed for multiple use. The particular design for buildings where the livestock is principally penned in the center of the buliding and having walkways down the outside, is shown in FIG. 1. In this type building manure handling systems normally are placed along the outer walls. Where the aisle for the livestock handlers is down the center, usually in buildings greater than 32 feet wide, I use the system shown in FIG. 2. In such buildings, manure handling systems are usually placed along the center aisles so that fresh cool air should be available there. The systems are essentially similar except for the process of creating turbulence in the in-coming air.

Referring to FIG. 1, I provide a duct system 10 having an outside opening 11 under the eaves 12 of the building adjacent its outer wall 13. I prefer to form the duct simply, by placing a board or similar barrier forming a cap 14 above the ceiling joints 15 so that the duct is simply the space between the joists 15, above the ceiling 16 and below the cap 14. Near the eave, it may be desirable, to provide walls 17 attached to the roof rafters 18 and extending to a soffit board 19 to enclose the duct more completely. For best results, these ducts are not isolated but extend along the full length of the side of the building.

The duct between the joists in the embodiment of FIG. 1 should be relatively short. A barrier board 20 should define the end of the duct and direct any incoming airflow through a deflector 22. Preferably, this barrier is formed as a part of the deflector. That deflector may be built as a separate piece as shown in FIGS. 4-6.

The deflector, as shown in FIGS. 4-6, includes an intake portion 35 extending normally upward and terminating in a flange 26 extending around the entire deflector. In some installations (best shown in FIG. 2 and described later) the deflector is open at the top 27. In the type of installation shown in FIG. 1, one wall of the upper section or intake portion 25 may be formed with an opening 28. In FIG. 1, this opening is open to the duct so that fresh air coming from the opening 11 will be conducted into the deflector. The intake section in either installation extends through the ceiling 16 and between the joists 15 and is fastened to the ceiling by fasteners such as nails extending through the flange 26.

Below the flange 26, the deflector includes an air directing portion 31. This director 31 includes principally a scoop-shaped extension adapted to change the direction of flow of the air approximately 90 degrees from a vertical to a nearly horizontal direction. In the system of FIG. 1, this air director 31 is placed to direct the air towards the outer wall 13. Because the deflector is placed close to the wall, the air stream thus directed as it impinges on the wall creates a turbulence which breaks up the draft so that there will not be a draft directed at the animals in the building, but at the same time providing relatively cool air in the region of the manure handling system.

The air directing portion 31 of the deflector may preferably be lined with a layer of insulating material 32. This allows cold air to be drawn through the deflector without chilling the exterior of the directing part. If that surface is chilled, condensation frequently forms and then drips into the building. Such dripping is undesirable, especially if it falls onto the livestock in the building.

A door 33 pivotted at the top is used to close the outlet of the air directing portion of the deflector. This door in the closed position is held slightly off the vertical to be certain of closure. Not more than ten degrees deviation from the vertical is necessary, and no particular angle is required so long as closure is accomplished when ventilation is not required.

In warmer temperatures, the exhaust fans which commonly draw the air from the buildings are run at higher speeds, thus drawing more air into the building. This increased flow will cause the door 33 to open somewhat wider and the air to leave the deflector in a more nearly horizontal flow. Thus, as the draft becomes stronger, the turbulence also becomes greater, with the result that direct draft is avoided as desired.

In the alternate system illustrated in FIG. 2, the upper part 25 of the deflector is left open at the top 27 and it does not have an opening 28 formed in it. No ducting from the eaves is required here, but air is admitted to the attic of the building through one or more cupolas 32. It will be evident that the system of getting air to the deflector are substantially interchangeable, although I prefer to use the ducted air where the deflectors are directed against an outer wall.

The deflectors are arranged in pairs in the system of FIG. 2 with the air from one of the pairs being directed toward the air coming from the other. Thus, the air streams impinge on each other creating the desired turbulence to avoid the undesired draft.

In both systems, air is blown out of the building by the usual ventilating fans (not shown) which discharge through vents 35 on the outer wall of the building. This action by exhausting stale air from the building serves to draw fresh air into the building either through the ducts of the system of FIG. 1 or through the cupolas 32 of FIG. 2.

I claim as my invention:

1. A system for providing fresh air to confined livestock comprising a building having a ceiling above a livestock confinement area, said building having an exterior formed to provide an opening to allow ingress of outside air into said building at a location above said ceiling, at least one deflector means installed on said ceiling in communication with said opening whereby said air will pass through said deflector means, said deflector means including air directing means, said air directing means being in close proximity to a wall of said building, and including an extension adapted to direct the air in a substantially horizontal direction to impinge on said wall to create turbulence.

2. The system of claim 1 in which door means are hinged to said deflector along the top edge of door in position to close the air directing part of said deflector.

3. The system of claim 1 in which said extension includes an insulated sheet covering one surface of said extension and adapted to insulate the other surface of said extension from said air to avoid condensation.

4. A system for providng fresh air to confined livestock comprising a building having a ceiling above a livestock confinement area, said building having an exterior formed to provide an opening to allow ingress of outside air into said building at a location above said ceiling, deflector means installed on said ceiling in communication with said opening whereby said air will pass through said deflector means, said deflector means being mounted in closely spaced pairs, each of said deflector means including air directing means having extensions adapted to direct the air from one member of said pairs to impinge on air from the other member of said pairs to create turbulence.

* * * * *